July 12, 1960  E. C. SCHNEIDER  2,944,857
BEARING MOUNTING AND LUBRICATION
Filed Aug. 4, 1958

INVENTOR
EDGAR C. SCHNEIDER
BY
ATTORNEY

United States Patent Office
2,944,857
Patented July 12, 1960

2,944,857

BEARING MOUNTING AND LUBRICATION

Edgar C. Schneider, East Hartford, Conn., assignor to United Aircraft Corporation, East Hartford, Conn., a corporation of Delaware Filed Aug. 4, 1958, Ser. No. 752,943

8 Claims. (Cl. 308—187)

This invention relates to a bearing mounting and particularly to a mounting for use in a portion of a device where the shaft supported by the bearing is exposed to relatively high temperatures.

In a gas turbine powerplant, one example of which is shown in Savin 2,747,367, the shaft is supported within the casing by several axially spaced bearings, one of which is normally located adjacent to the upstream end of the combustion chamber and others of which are located just upstream and just downstream of the turbine. The bearing and the shaft supported thereby are inevitably exposed in these locations to relatively high temperatures. One feature of the invention is an arrangement for isolating the bearing thermally from the shaft thereby to minimize the heat transfer between the bearing and the shaft.

Another feature of the invention is an arrangement for combining the bearing isolation or insulation structure with the ludbricant system for the bearing such that the same fluid can be used for accomplishing both purposes. Another feature is the mounting of the bearing on a sleeve which surrounds the supporting shaft and is spaced from the shaft adjacent to the bearing to reduce the heat transfer between the bearing and shaft.

One feature is a flexible mounting for the shaft bearings by which to minimize the transfer of any thermal distortion from the shaft to the bearing.

Other features and advantages will be apparent from the specification and claims, and from the accompanying drawings which illustrate an embodiment of the invention.

Figure 1:
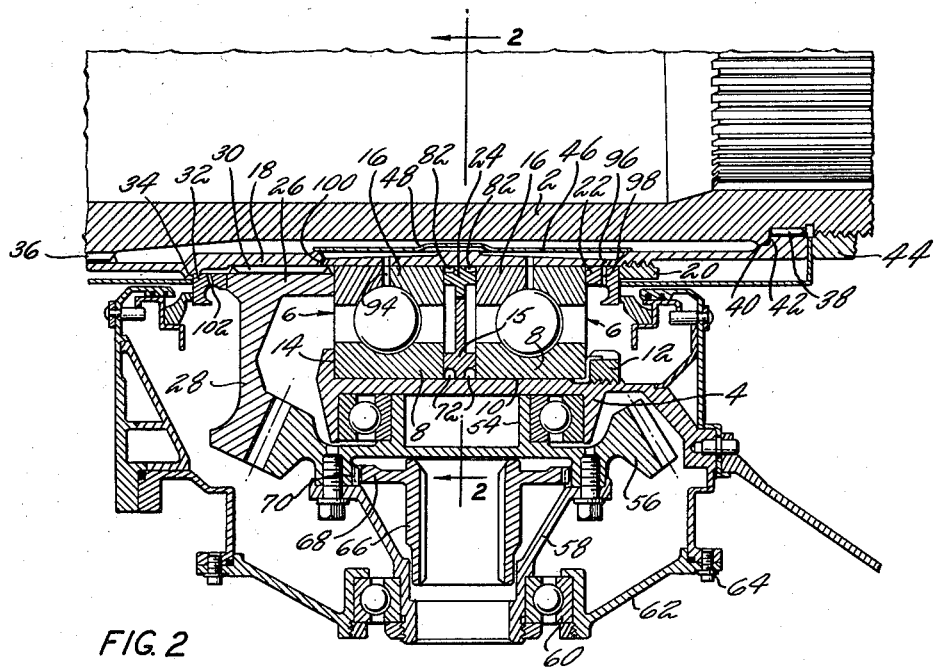
Fig. 1 is a fragmentary longitudinal sectional view showing the bearing and its relationship to the shaft supported by it.

The invention is shown as applied specifically to the support of a gas turbine shaft within a surrounding housing and in the arrangement shown, the shaft 2 is supported within the surrounding housing 4 by the pair of ball bearings 6. The outer races 8 of the bearings fit within a bore 10 in the housing 4 and are clamped therein by a ring 12 which holds the bearing races against a shoulder 14 in the housing. A spacer 15 holds the races 8 apart.

The inner races 16 for the bearing are mounted on a sleeve 18 and are clamped thereon by a threaded ring 20 which in the particular arrangement shown engages with a spacer ring 22 which engages in turn the inner race 16 for the righthand bearing. This race is clamped against spacer 24 located between the two bearing races and the lefthand race engages the hub 26 of a bevel gear 28 splined as at 30 to the sleeve 18. The hub 26 in turn engages a spacer ring 32 engaging a shoulder 34 on the sleeve. The beveled gear and its inclusion with the remaining elements on the sleeve is not in itself an essential feature to the invention and the shoulder 34 and adjacent ring 32 could equally well be located directly adjacent to the lefthand race 16.

The sleeve 18 is larger in diametear than the outer diameter of the shaft 2 for an axial distance greater than the axial spacing between the rings 22 and 32, as shown, so that when the sleeve is mounted over the shaft the sleeve is out of contact with the shaft for this axial dimension.

At the lefthand end of the sleeve it is splined to the shaft as at 36 and at its righthand end the sleeve is again splined to the shaft as at 38. Cooperating shoulders 40 and 42 on the shaft and sleeve, respectively, adjacent to the splines 38 determine the position of the sleeve on the shaft and the sleeve is clamped against the shoulder 40 by a threaded clamping ring 44.

To minimize the heat transfer between the shaft 2 and sleeve 18 a heat shield 46 is positioned between the sleeve and shaft over an axial dimension somewhat longer than and located within the region of the bearings 6. This heat shield is spaced from both the sleeve and shaft, as shown, except at its ends and the shield may have a centrally located groove 48 for a purpose to be described later.

The housing 4 may have at one point in its periphery a bore 50, the axis of which is at right angles to the axis of the shaft 2 and this bore receives a bearing 52 for the support of the hub 54 of a bevel gear 56 which meshes with the gear 28. This gear has an axial extension 58 attached thereto which engages within a bearing 60 for additional support of the gear. Bearing 60 is supported from the housing 4 by a ring 62 which surrounds the housing 4 and is attached as by bolts 64 to the housing. Within the bevel gear assembly is a splined sleeve 66 which may be used for driving an accessory. This sleeve has a flange 68 thereon, the periphery of which is splined as at 70 to a portion of the bevel gear 56.

Figure 2:
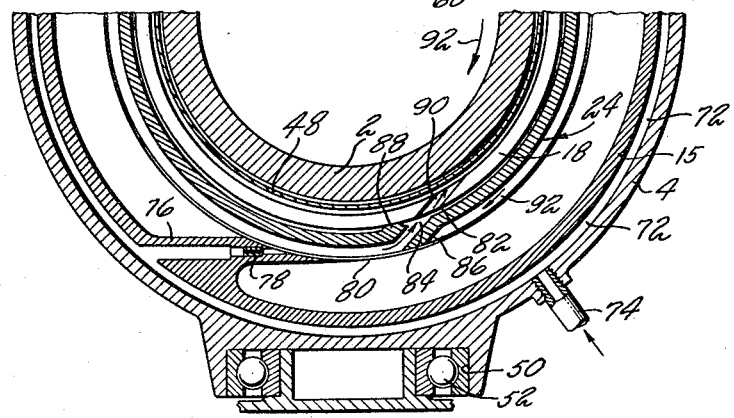
Fig. 2 is a fragmentary transverse sectional view along the line 2—2 of Fig. 1.

The spacer 15 between the outer races 8 has opposed notches 72 in its outer periphery which cooperate with the races 8 and with the housing 4 to form annular passages, one of which is shown in Fig. 2. Lubricant is supplied as by an inlet pipe 74 to the passages. The spacer 15 also carries inwardly projecting bores 76 in each of which is located a nozzle 78 through which lubricant is discharged tangentially to the inner peripherly 80 of the spacer.

In cooperation with the nozzles 78 the spacer 24 is cut away at its inner corners to form with the bearing races 16 and the sleeve 18 spaced circumferential grooves 82. At one or more points in the periphery of the spacer 24 there is an obliquely positioned passage 84, one wall of which is defined by an obliquely extending flange 86 in such a position as to be engaged by the jet of oil from the nozzles 78 and to direct the oil into the passage 82. Adjacent to the passage 84 is a projection 88 which crosses the passage 82, as shown.

The sleeve 18 has in alignment with the oblique passage 84 a comparable oblique passage 90 so that as the shaft and sleeve rotate in the direction of the arrow 92, Fig. 2, the oil jet from the nozzle 78 is directed through the aligned passages 84 and 90 and into the centrally located groove 48 in the heat shield 46. The lubricant flows over the inner surface of the sleeve 18 in both directions from the passage 90. Some of the lubricant flows through radial passages 94 in the inner races 16 and the remainder of the lubricant flows through aligned passages 96 in the sleeve and in a passage 98 in the spacer 22. At the lefthand end of the sleeve lubricant flows through a passage 100 in the sleeve along the splines 30 and through a discharge opening 102 in the spacer 32.

With this arrangement the inner surface of sleeve 18 over the portion with which the bearing engages is cooled by the lubricant and is accordingly kept at a relatively cool temperature. The heat shield 46 serves to minimize radiation of heat from the shaft 2 at the sleeve 18 and also confines the oil within the desired portion of the space between the shaft and sleeve. It will be understood that the quantity of lubricant used may be determined by the area of the nozzles 78 and by the number of nozzles provided. That is to say, if the single nozzle 78 for each bearing is not adequate additional circumferentially spaced nozzles may be added and also additional obliquely positioned passages 84 and 90 may be provided if more flow of cooling lubricant to the inside of the sleeve is found desirable or necessary.

Figure 3:
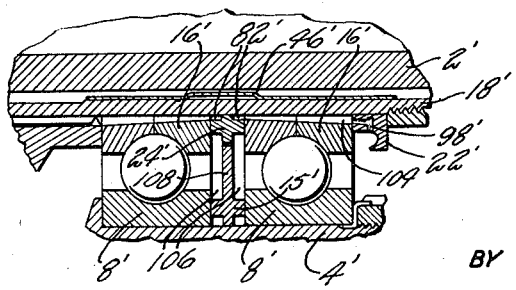
Fig. 3 is a fragmentary sectional view similar to Fig. 1 showing a modification.

In the modification of Fig. 3, the housing 4' supports the outer races 8' which are held in spaced relation by a spacer 15'. The inner races 16' for the bearings are mounted on the sleeve 18' in a manner similar to that shown in Fig. 1. The sleeve may or may not have internally a heat shield 46' in the same arrangement as in Fig. 1 dependent upon the operating thermal gradient. In Fig. 3, however, the cooling and lubricating fluid does not go from the passages 82' into the space between the shaft 2' and sleeve 18' but flows axially from the annular grooves 82' through a large number of axial grooves 104 formed in the inner surfaces of the inner races 16'. In this arrangement the bearings are lubricated by the flow of lubricant from the channels 104 through the channel 98' in the spacer 22 and also by the lubricant that is not picked up by the oblique passages in the inner spacer 24 and thereby flows directly to the bearings from the spacers 106 on opposite sides of the central disc portion 108 of the spacer 15'.

It is to be understood that the invention is not limited to the specific embodiment herein illustrated and described, but may be used in other ways without departure from its spirit as defined by the following claims.

I claim:

1. In a bearing mounting, a housing, a shaft within the housing and a bearing between said housing and shaft including inner and outer races and rolling bearing elements between and engaging said races, the outer race being mounted in and supported by said housing, a sleeve mounted on and surrounding said shaft and being spaced from said shaft except at axially spaced points, the inner bearing race being mounted on said sleeve between the axially spaced poits, means for introducing lubricant between said shaft and said sleeve, and orifices in said inner race and sleeve for delivering to said bearing elements lubricant supplied by said means.

2. In a bearing mounting, a housing, a shaft within the housing and a bearing between said housing and shaft including inner and outer races and rolling bearing elements between and engaging said races, the outer race being mounted in and supported by said housing, a sleeve mounted on and surrounding said shaft and being spaced from said shaft except at axially spaced points, the inner bearing race being mounted on said sleeve between the axially spaced points, means for introducing lubricant between said inner race and said sleeve including axial grooves in said inner race, and means for directing the supply of lubricant from said axial grooves to the bearing.

3. In a bearing mounting, a housing, a shaft within the housing and a bearing between said housing and shaft including inner and outer races and rolling bearing elements between and engaging said races, the outer race being mounted in and supported by said housing, a sleeve mounted on and surrounding said shaft and being spaced from said shaft except at axially spaced points, the inner bearing race being mounted on said sleeve between the axially spaced points, and a heat shield inside said sleeve and spaced radially from the sleeve and the shaft over the axial dimension of the sleeve in contact with the inner bearing race.

4. In a bearing mounting, a housing, a shaft within the housing and a bearing between said housing and shaft including inner and outer races and rolling bearing elements between and engaging said races, the outer race being mounted in and supported by said housing, a sleeve mounted on and surrounding said shaft and being spaced from said shaft except at axially spaced points, the inner bearing race being monuted on said sleeve between the axially spaced points, and a heat shield inside said sleeve and spaced radially from the sleeve and the shaft over the axial dimension of the sleeve in contact with the inner bearing race, said shield having a tight connection at each end with the sleeve to form a chamber between said shield and sleeve and means for introducing coolant into said chamber.

5. In a bearing mounting, a housing, a shaft within the housing and a bearing between said housing and shaft including inner and outer races and rolling bearing elements between and engaging said races, the outer race being mounted in and supported by said housing, a sleeve mounted on and surrounding said shaft and being spaced from said shaft except at axially spaced points, the inner bearing race being mounted on said sleeve between the axially spaced points, and a heat shield inside said sleeve and spaced radially from the sleeve and the shaft over the axial dimension of the sleeve in contact with the inner bearing race, said shield having a tight connection at each end with the sleeve to form a chamber between said shield and sleeve and means for introducing coolant into said chamber, and passages through said sleeve spaced from said coolant introducing means to provide for the escape of said coolant from the chamber.

6. In a bearing mounting, a housing, a shaft within the housing and a bearing between said housing and shaft including inner and outer races and rolling bearing elements between and engaging said races, the outer race being mounted in and supported by said housing, a sleeve mounted on and surrounding said shaft and being spaced from said shaft except at axially spaced points, the inner bearing race being mounted on said sleeve between the axially spaced points, and a heat shield inside said sleeve and spaced radially from the sleeve and the shaft over the axial dimension of the sleeve in contact with the inner bearing race, said shield having a tight connection at each end with the sleeve to form a chamber between said shield and sleeve and means for introducing coolant into said chamber, and passages through said sleeve and the inner race for the escape of the coolant onto the bearing elements.

7. In a bearing mounting, a shaft, a sleeve surrounding said shaft and spaced from said shaft except at its opposite ends thereof, a heat shield positioned between and spaced from said sleeve and shaft except at opposite ends of the heat shield, the ends of the heat shield being in contact with the sleeve thereby to define a coolant chamber on the inner wall of the sleeve, a bearing mounted on the sleeve externally of the chamber and a stationary housing within which the bearing is positioned.

8. In a bearing mounting, a shaft, a sleeve surrounding said shaft and spaced from said shaft except at its opposite ends thereof, a heat shield positioned between and spaced from said sleeve and shaft except at opposite ends of the heat shield, the ends of the heat shield being in contact with the sleeve thereby to define a coolant chamber on the inner wall of the sleeve, a bearing mounted on the sleeve externally of the chamber and a stationary housing within which the bearing is positioned, means for supplying coolant through said housing to the chamber and coolant passages communicating with the chamber and the bearing for the discharge of the coolant from the chamber to the bearing.

References Cited in the file of this patent

UNITED STATES PATENTS 2,493,160    Morley _____ Jan. 3, 1950

FOREIGN PATENTS 195,392    Great Britain _____ Apr. 24, 1924